(12) United States Patent
Yazdani et al.

(10) Patent No.: US 6,614,789 B1
(45) Date of Patent: Sep. 2, 2003

(54) METHOD OF AND APPARATUS FOR MATCHING STRINGS OF DIFFERENT LENGTHS

(76) Inventors: Nasser Yazdani, 579 F., Sarah La., Creve Coeur, MO (US) 63146; Paul Seungkyu Min, 53 Arundel Pl., Clayton, MO (US) 63105

( * ) Notice: Subject to any disclaimer, the term of this patent is extended or adjusted under 35 U.S.C. 154(b) by 0 days.

(21) Appl. No.: 09/474,452

(22) Filed: Dec. 29, 1999

(51) Int. Cl.$^7$ ................................................ H04L 12/28

(52) U.S. Cl. ....................................... 370/392; 370/401

(58) Field of Search ................................. 370/389, 392, 370/401, 402, 437, 404, 405, 406; 707/6, 7

(56) References Cited

U.S. PATENT DOCUMENTS

| | | | |
|---|---|---|---|
| 4,363,091 A | * 12/1982 | Pohlman, et al. | 711/2 |
| 4,464,650 A | 8/1984 | Eastman et al. | |
| 5,060,146 A | * 10/1991 | Chang et al. | 707/7 |
| 5,225,833 A | * 7/1993 | Fisher et al. | 341/90 |
| 5,546,080 A | 8/1996 | Langdon et al. | 341/107 |
| 5,758,024 A | 5/1998 | Alleva | |
| 5,781,772 A | 7/1998 | Wilkinson, III et al. | |
| 5,787,430 A | * 7/1998 | Doeringer et al. | 707/100 |
| 5,799,303 A | * 8/1998 | Tsuchimura | 707/7 |
| 5,812,853 A | 9/1998 | Carroll et al. | |
| 6,430,527 B1 | * 8/2002 | Waters et al. | 703/3 |
| 6,526,055 B1 | * 2/2003 | Perlman et al. | 370/392 |

OTHER PUBLICATIONS

Bozkaya, et al., Matching and indexing sequences of different lengths, Nov. 10–14, 1997, In proceedings of the 6 th Int'l Conference on Information and Knowledge Management, Las Vegas, NV, pp. 128–135.*

Yazdani et al., Prefix Trees: New Efficient Data Structures for Matching Strings of Different Lengths, 2001, IEEE, pp. 76–85.*

Doeringer et al., Routing on Longest–Matching Prefixes, Feb. 1996, IEEE/ACM Trans. Networking, vol. 4, No. 1, pp. 86–97.*

A. Brodnik, S. Carlsson, M. Degermark, and S. Pink, *Small Forwarding Tables for Fast Routing Lookups*, Proceeding of ACM SIGCOMM Conference 1997, pp. 3–14, Sep. 14–18, 1997, Cannes, France.

G. Karlsson and S. Nilsson, *Fast address lookup for Internet routers*, Proceedings of IEEE Broadband Communications 98, Apr. 1998 (12 pages).

V. Srinivasan and G. Varghese, *Fast Address Lookups using Controlled Prefix Expansion*, Proceedings of ACM Sigmetrics, Sep. 1998 (37 pages).

(List continued on next page.)

*Primary Examiner*—Chau Nguyen
*Assistant Examiner*—Keith M. George
(74) *Attorney, Agent, or Firm*—Thompson Coburn, LLP

(57) ABSTRACT

A method and apparatus is provided for comparing and sorting data strings of different lengths, in a given character set, and modifying the data such that queries can be run using different search trees. Three different search trees are provided, including: a binary prefix tree and two m_way tree structures, a static m_way prefix tree and a dynamic m_way prefix tree. The data strings may be prefixes of addresses in TCP/IP protocols and searching may be performed using a host address of a computer network. The method further provides for transmitting packet information associated with the network address. Additionally, switching packets in layer 3 and 4 of the TCP/IP protocol and sending the packets to designated ports of a device is provided. The method may also provide differentiated service or data protection, such as a firewall, based on packet classification information.

41 Claims, 5 Drawing Sheets

OTHER PUBLICATIONS

B. Plattner, J. Turner, G. Varghese, and M. Waldvogel, *Scalable High Speed IP Routing Lookups*, Proceedings of ACM SIGCOMM Conference 1997, pp. 25–36, Sep. 14–18, 1997, Cannes, France.

T.V. Lakshman and D. Stiliadis, *High–Speed Policy–based Packet Forwarding Using Efficient Multi–dimensional Range Matching*, Proceeding of ACM SIGCOMM Conference 1998, pp. 203–214, Aug. 31–Sep. 4, 1998, Vancouver, B.C., Canada.

D. Decasper, Z. Dittia, G. Parulkar, and B. Plattner, *Routing Plugins: A Modular and Extensible Software Framework for Modern High Performance Integrated Service Routers*, Washington University Technical Report WUCS–98–08, 27 pages, Feb. 1998, St. Louis, MO.

P. Gupta, S. Lin, and N. McKeown, *Routing Lookups in Hardware at Memory Access Speeds*, IEEE Infocom vol. 3, pp. 1240–1247, Apr. 1998, San Francisco, CA.

B. Lampson, V. Srinivasan and G. Varghese, *IP Lookups using Multiway and Multicolumn Search*, IEEE Infocom '98, 25 pages, Apr. 1998, San Francisco, CA.

K. Sklower, *A Tree–Based Routing Table for Berkeley Unix*, Proceedings of the USENIX Winter 1991 Technical Conference, pp. 93–104, Jan. 1991, Dallas, TX.

J. Turner, *Design and Analysis of Switching Systems*, Washington University, St. Louis, MO, Jan. 1999.

\* cited by examiner

| Prefix | Next Hop |
|---|---|
| 10* | 7 |
| 01* | 5 |
| 110* | 3 |
| 1011* | 5 |
| 0001* | 0 |
| 01011* | 7 |
| 00010* | 1 |
| 001100* | 2 |
| 1011001* | 3 |
| 1011010* | 5 |
| 0100110* | 6 |
| 01001100* | 4 |
| 10110011* | 8 |
| 10110001* | 10 |
| 01011001* | 9 |

(0001*, 0)   (001100*, 2)         (01*, 7)                    (10*, 7)                    (110*, 3)
   ↓                                 ↓                          ↓
(00010*, 1)    {(01001100*, 4)  (01011001*, 0)      {(10110011*, 8)   (10110001*, 10)
               (0100110*, 6)       (01011*, 7)}     (1011001*, 3)  1011*, 5)   (10110101*, 5) }

(0001*, 0)     (001100*, 2)      (0100110*, 6)        (01011*, 7)
   ↓                                  ↓                   ↓
(00010*, 1)                      (01001100*, 4)      (01011001*, 0)

| Prefix | Abbreviation | Prefix | Abbreviation |
|---|---|---|---|
| 10 | - | 1101110010 | K |
| 01 | - | 10001101 | L |
| 110 | - | 11101101 | M |
| 1011 | - | 01010110 | N |
| 0001 | - | 00100101 | O |
| 01011 | - | 100110100 | P |
| 00010 | - | 101011011 | Q |
| 001100 | A | 11101110 | R |
| 1011001 | B | 10110111 | S |
| 1011010 | C | 011010 | T |
| 0100110 | D | 011011 | U |
| 01001100 | E | 011101 | V |
| 10110011 | F | 0110010 | W |
| 10110001 | G | 101101000 | X |
| 01011001 | H | 101101110 | Y |
| 001011 | I | 00011101 | Z |
| 00111010 | J | 011110110 | II |

METHOD OF AND APPARATUS FOR MATCHING STRINGS OF DIFFERENT LENGTHS

FIELD OF THE INVENTION

The present invention relates to comparing and sorting data strings, and in particular, to comparing and sorting data strings of different lengths, such that the data strings can be queried using tree structures. Specifically, the invention relates to performing this process on data strings of different lengths that may be prefixes of each other.

BACKGROUND OF THE INVENTION

Data matching, and in particular, prefix matching is known and applied to various applications. In general, a database search is performed for data strings which are associated with a given input string or key. The association between the input string and the data strings, which is the search criteria, depends on the particular application. The particular search may require locating the longest, shortest or all data strings which are a prefix of a query string. The applications in which such matching is useful are numerous and, in particular, include layer 3 and layer 4 switching in TCP/IP protocols, directory lookup in a telephone context, on-line dictionaries and spell checkers, to name just a few.

The prefix matching problem constitutes the essential part of some applications in the computer realm and related area. The assumption in the prior art relating to these applications is that there are strings of an alphabet $\Sigma$ which are ordered. The strings can have different lengths and can be prefixes of each other. The data strings are stored in a database along with other associated data.

A user may want to find the longest, smallest or all strings which are a prefix of a query string. In other applications, a user may be interested in finding all the data strings, such that a given input string is a prefix of them. It is very important to respond to any such query in a reasonable amount of time and in as efficient a manner as possible. Each application may have its own alphabet set and the number of characters in the alphabet handling these queries determines the complexity of the search.

The number of hosts on the Internet grows rapidly everyday. New data intensive applications such as multimedia, hypertext data, video conferencing, remote imaging, etc., cause the data traffic to explode. These applications demand higher bandwidth on the communication line and faster and more efficient computer networks. To keep up with these demands and the traffic, the speed of communication lines has been increased to several gigabits per second in the last few years. As a result, routers must forward IP packets more efficiently. Routers search the Internet Protocol (IP) routing tables to find the address of the next hops (or hubs) to which the packet is to be forwarded on the path towards the final destination. Each router has its own routing table consisting of pairs of prefixes of networks addresses and their corresponding hops. The routers usually must determine the longest matching network prefix with a packet destination address and take the corresponding hop. Finding the next hop for each packet becomes harder and harder because the increasing number of hosts on the Internet expands the global network and increases the number of hops to go through. Therefore, the size of the routing table grows accordingly. Increasing the speed of data links helps to shorten the time to send a packet. Advances in the semiconductor technology improve the processing capability of CPU chips and can help reduce the time of the table lookup. However, because the link speed grows faster than the processing speed, and the size of data is growing also, the IP lookup problem is resulting in a serious bottleneck on the information superhighway. The alphabet in this application is very limited (only {0,1}), however the problem is very challenging.

The IP lookup or layer 3 switching is not the only application of prefix matching of the {0,1} alphabet in routers. Internet Service Providers (ISPs) like to provide different services to different customers. Some organizations filter packets from the outside world by installing firewalls in order to deny access to unauthorized sources. Supporting this functionality requires packet filtering or packet classification mechanisms in layer 4 of TCP/IP protocols. Forwarding engines must be able to identify the context of packets and classify them based on their source and destination address, protocols, etc., or on all of this information. This classification must be performed at the wire speed. Routers attempt to handle this by keeping a set of rules which applies to a range of network addresses. Therefore, again we encounter the prefix matching problem in two dimensional space; i.e., for source and destination addresses of a packet.

Applications of prefix matching are not restricted to layer 3 and 4 switching. Some other useful applications include directory lookup in a telephone context, on-line dictionaries, spell checkers and looking up social security numbers. U.S. Pat. No. 5,758,024 discloses the prefix matching problem relating to computer speech recognition and proposes a compact encoding pronunciation prefix tree scheme. A method to improve the parsing process of source codes which use prefix matching is also disclosed in U.S. Pat. No. 5,812,853. The approach in this disclosure identifies the previously-parsed prefixes of a source, creates parsers in the parser states corresponding to the identified prefix and parses the remaining portion of the translation unit. Finally, U.S. Pat. No. 4,464,650 discloses an apparatus and method using prefix matching in data compression. Data compression is crucial in database applications as well as in data communication. The patent includes parsing the input stream of data symbols into the prefix and data segments, and using the previously longest matching prefixes to compress the data.

Traditionally, the prefix matching search has been performed by the Trie structure. A trie is based on the "thumb-index" of a large dictionary in which a word can be located by checking consecutive letters of a string from the beginning to the end. A trie is essentially an m_way tree whereas a branch in each node corresponds to a letter or character of alphabet $\Sigma$. A string is represented by a path from the root to a leaf node. The trie structure may be modified and applied to all of the applications discussed above. In some applications, for example in the longest prefix matching IP lookup context, researchers have been able to handle the problem in some more subtle ways than the trie structure, due in part to the limited number of characters in the alphabet. These methods do not have the generality or broad applicability of the trie structure. The main problems with trie structures are its inflexibility; i.e. the number of branches corresponds to the number of characters, and having additional blank nodes as place holders. Furthermore, in general, the search time is proportional to the length of the input strings.

Patricia Trie modified the binary trie by eliminating most of the unnecessary nodes and the modification is the basis of several new methods that have been proposed in the last several years. These approaches attempt to check several characters, or several bits, at each step, instead of checking only one character. Because checking several characters may deteriorate memory usage and leave many memory spaces unused, all of these approaches try to minimize the memory waste. V. Srinivasan and G. Varghese, in "Fast Address Lookups using Controlled prefix", Proceedings of ACM Sigmetrics, Sep. 1998 proposed to expand the original prefixes (strings) into an equivalent set of prefixes with fewer lengths, and then, apply a dynamic programming technique to the overall index structure in order to optimize memory usage. Other methods proposed a specific case wherein local optimization of memory usage was applied in each step. This is the case in S. Mission and G. Karlsson's, "Fast Address Look-Up for Internet Routers",Proceedings of IEEE Broadband Communications 98, April. 1998. Finally, a new scheme from Lulea University of Technology, attempts to reduce the size of the data set (routing table) so that it fits in the cache of a system. See Mikael Degermark, Andrej Brondnik, Suante Carlson and Stephen Pink's, "Small Forwarding Tables for Fast Routing Lookups", Proceeding of SIGCOMM., 1997.

All of these multi-bit trie schemes are designed for the IP lookup problem and may work well with the existing size of data, the number of prefixes in the lookup table and with the current IP address length, which is 32. Nonetheless, these schemes generally do not scale well for larger size data or data of longer string length, for example, the next generation of IP (Ipv6) with 128 bit address.

A barrier to applying well known data structures,. such as the binary search tree, to the prefix matching problem, is the lack of a mechanism to sort and compare strings of different lengths when the strings are prefixes of each other. Therefore, what has been needed is a new comparison, indexing and searching method and apparatus for performing prefix matching, that functions independent from the lengths of data or input strings, and is general enough in structure to apply to most, if not all, applications. Thus, a method and apparatus was needed that was generic and independent of any alphabet or character structure, while efficient in memory usage and search time.

In particular, efficient prefix trees for quickly accessing data were needed in applications which involve matching strings of different lengths of a generic alphabet $\Sigma$. In addition to exact match queries, the tree must also allow for the following queries: (1) finding the longest string which is a prefix of a given query string; (2) finding the smallest prefix of a given query string; (3) listing all the strings which are prefixes of a given query string; and (4) finding all the strings such that a given query string is a prefix of them.

SUMMARY OF THE INVENTION

The present invention provides a method and apparatus for matching data strings of different lengths, wherein one data string may be the prefix of another data string. The method and apparatus include comparing and sorting data strings of different lengths and utilizing data tree structures to search for matching data strings, as well as prefixes of a given string. The invention applies to data strings comprised of letters or characters from any alphabet or database.

A method is provided for matching strings of different lengths, wherein the strings can be prefixes of each other and can be from any alphabet $\Sigma$. Applications of this invention are numerous. When the alphabet is alphanumeric, the possible applications include on-line dictionaries, spell checkers, telephone directory lookup, computer speech recognition, data compression, source code compiling, as well as others. However, the most crucial applications of (prefix) string matching of different lengths are in layer 3 and 4 switching in the {0,1} alphabet set, and in particular, when routers try to forward IP packets in Internet or classify packets for providing different types of services for different customers.

The method and apparatus of this invention provide for comparing data strings of different lengths, sorting the data strings of different lengths based on this comparison and building tree structures for searching strings, as well as prefixes, within a large data set. A binary prefix tree is provided that efficiently utilizes machine memory space and gives a search performance comparable to the typical binary search tree. A static m_way prefix tree is also provided to get better search performance. Finally, a dynamic m_way prefix tree is provided, which performs well in data environments with high levels of transactions. The proposed method and apparatus, including the data structures, are simple to implement in hardware and software, scalable to accommodate large data sizes, independent from the data string lengths, flexible enough to handle higher dimension data and applicable to any character alphabet.

Specifically, according to one aspect of the present invention a method is provided for comparing a data set comprised of at least two data strings of indeterminate length in a common character set, with the method comprising comparing said data strings to identify the existence, or non-existence, of a common prefix portion. If a common prefix portion exists, then setting a specific check point character such that the probability of a character in the character set being greater than the check point character is about equal to the probability of a character in the character set being less than the check point character. If the common prefix portion comprises the entirety of one of said data strings, then comparing a first additional character in a longer length data string to the check point character to determine if the first additional character is less than or equal to the value of the check point character, with the longer length data string having a lesser value if the value of the first additional character is less than or equal to the value of the check point character and the longer length data string having a greater value if the first additional character is greater than the value of the check point character.

If the common prefix portion comprises less than the entirety of said data strings, then comparing a first discriminant character in each of the data strings to determine if one discriminant character is less than or greater than another discriminant character, and if the value of the first discriminant character of one of the data strings is less than the first discriminant character of another data string, the data string having a lesser value than another data string, if the value of the first discriminant character of one of the data strings is greater than the first discriminant character of another data string, the data string having a greater value than another data string. Finally, if the value of the first discriminant character or each data string is equal, comparing the next character in each data string.

If no common prefix portion exists, then the method compares the first character in one data string to the first character of another data string to determine if the first character is less than or greater than the value of the first character of the another data string. If the value of the first character is less than the first character of the another data string, then the data string has a lesser value. If the value of the first character is greater than the first character of the another data string, then the data string has a greater value.

Finally, if the value of the first character is equal to the first character of the another data string, comparing the next character in each data string.

The method may further provide the step of sorting the data strings based on the data string value and may include first placing data strings having a common prefix portion into the sorting bag of the common prefix. Further, the method may first sort the data strings having no common prefix portion and then sort the data strings in the sorting bag.

The method may further comprise the step of recursively dividing the sorted data strings into two data spaces to build a binary search tree or recursively dividing the sorted data strings into more than two data spaces to build a static m_way tree. The tree may be divided such that the method first determines the data string having the shortest character length before recursively dividing the data strings into two data sets, with the data strings of lower value than the data string having the shortest character length and the data strings of higher value than the data string having the shortest character length divided into different sub-trees based on the shortest length data string.

In building the dynamic m_way tree additional data strings may be dynamically inserted into the tree to build a dynamic m_way tree. The m_way tree may be divided into two sub-trees if the number of elements at a node exceeds a pre-determined value or if the data strings at a node include a common prefix portion of the node data element. The m_way tree may further be divided into two sub-trees at a median point if the data strings at the node do not include any common prefix portion of the node data element.

The method further comprises dynamically inserting additional data strings by replacing a data element with an inserted data element if the inserted data element is a common prefix portion of the replaced element, then sorting all other data elements in the sub-tree of the replaced data element in respect to the inserted element.

The data strings may be alphanumeric prefixes of other alphanumeric data strings and the step of searching may provide for searching using an alphanumeric argument of the prefix. The method may further provide for data strings that are prefixes of network addresses in TCP/IP protocols along with a hops name and associated address in a router and further comprise the step of searching the data strings using a packet destination address to find a longest prefix match. The method may transmit data to the hop associated with the longest matching network address.

In the method, the data strings may be prefixes of network addresses in TCP/IP protocols along with port numbers, protocol name and address associated with the network address in a router, with the method further comprising using host addresses contained in the TCP/IP packet for searching and classifying packets based on the source and destination address. The host address may be contained in a TCP/IP packet with the method further comprising switching packets in layer 3 or layer 4 of the TCP/IP protocol.

The method, when transmitting packet information, may further comprise transmitting or filtering packet information using packet classification information and provide differentiated service or data protection based on the packet classification information.

The method may comprise determining the longest prefix string of a query string based on the sorted data elements or determining the shortest prefix string of a query string based on the sorted data elements. The method may also comprise determining all prefix data strings of a query string based on the sorted data elements or determining all data strings of which the query string is a prefix based on the sorted data elements.

In another aspect of the present invention a method is provided for comparing, sorting and searching a data set comprised of at least two data strings of indeterminate length in a common character set. The method comprises comparing said data strings to identify the existence, or non-existence, of a common prefix portion. If a common prefix portion exists, then setting a specific check point character such that the probability of a character in the character set being greater than the check point character is about equal to the probability of a character in the character set being less than the check point character.

If the prefix portion comprises the entirety of one of said data strings, then comparing a first additional character in a longer length data string to the check point character to determine if the first additional character is less than or equal to the value of the check point character, with the longer length data string having a lesser value if the value of the first additional character is less than or equal to the value of the check point character and the longer length data string having a greater value if the first additional character is greater than the value of the check point character.

If the common prefix portion comprises less than the entirety of said data strings, then comparing a first discriminant character in each of the data strings to determine if one discriminant character is less than or greater than another discriminant character. If the value of the first discriminant character of one of the data strings is less than the first discriminant character of another data string, the data string having a lesser value than another data string. If the value of the first discriminant character of one of the data strings is greater than the first discriminant character of another data string, the data string having a greater value than another data string. Finally, if the value of the first discriminant character of each data string is equal, comparing the next character in each data string.

If no common prefix portion exists, the method compares the first character in one data string to the first character of another data string to determine if the first character is less than or greater than the value of the first character of the another data string. If the value of the first character is less than the first character of the another data string, then the data string has a lesser value. If the value of the first character is greater than the first character of another data string, then the data string has a greater value. Finally, if the value of the first character is equal to the first character of the another data string, comparing the next character in each data string.

The method further provides for sorting the data strings based on the data string value, building a search tree and searching the data strings using the search tree. The method may comprise the step of first placing data strings having a common prefix portion into a sorting bag.

The data strings may be prefixes of network addresses in TCP/IP protocols along with a hops name and associated address in a router, with the method further comprising the step of searching the data strings using a host address of a computer network to find a longest prefix match. Further, the method may provide for transmitting packet information associated with the network address to a device associated with the longest matching network address. The host address may be contained in a TCP/IP packet, with the method further comprising switching packets in layer 3 or layer 4 of the TCP/IP protocol.

The data strings may be prefixes of network addresses in TCP/IP protocols along with port numbers, protocol name and address associated with the network address in a router, with the method further comprising using host addresses contained in the TCP/IP packet for searching and classifying packets based on the source and destination address.

In yet another aspect of the present invention a router for forwarding data packets is provided, wherein the router finds the next hop for each packet by finding the longest data prefix matching a packet destination address and a corresponding hop from a prefix lookup table, wherein data strings are of indeterminate length in a common character set. The router comprises a comparator for comparing said data strings to identify the existence, or non-existence, of a common prefix portion, and wherein if a common prefix portion exists, the comparator sets a specific check point character such that the probability of a character in the character set being greater than the check point character is about equal to the probability of a character in the character set being less than the check point character. If the prefix portion comprises the entirety of one of said data strings, then the comparator compares a first additional character in a longer length data string to the check point character to determine if the first additional character is less than or equal to the value of the check point character, with the longer length data string having a lesser value if the value of the first additional character is less than or equal to the value of the check point character and having a greater value if the first additional character is greater than the value of the check point character.

If the common prefix portion comprises less than the entirety of said data strings, then the comparator compares a first discriminant character in each of the data strings to determine if one discriminant character is less than or greater than another discriminant character. If the value of the first discriminant character of one of the data strings is less than the first discriminant character of another data string, then the data string has a lesser value than another data string. If the value of the first discriminant character of one of the data strings is greater than the first discriminant character of another data string, then the data string has a greater value than another data string. If the value of the first discriminant character of each data string is equal, the comparator compares the next character in each data string.

If no common prefix portion exists, then the comparator compares the first character in one data string to the first character of another data string to determine if the first character is less than or greater than the value of the first character of another data string, and if the value of the first character is less than the first character of another data string, the data string has a lesser value. If the value of the first character is greater than the first character of another data string, the data string has a greater value. If the value of the first character is equal to the first character of the another data string, the comparator compares the next character in each data string.

The router also includes a sorter for sorting the data strings based on the data string value and a database builder for building a search tree. The router may also comprise a search engine for finding the longest matching data string to a data packet. Additionally, the router may comprise a transmitting unit for transmitting the hop associated with the longest matching network address.

The host addresses contained in the TCP/IP packet may be used by the router to search and classify packets based on the source and destination address. With the host address contained in a TCP/IP packet, the router switches packets in layer 3 and layer 4 of the TCP/IP protocol.

The router may further comprise a transmitting unit providing differentiated service or data protection based on the packet classification information.

These and other features and advantages of the present method and apparatus, will in part apparent, and in part pointed out hereinafter.

DETAILED DESCRIPTION OF THE PREFERRED EMBODIMENTS

Figures 1, 2:
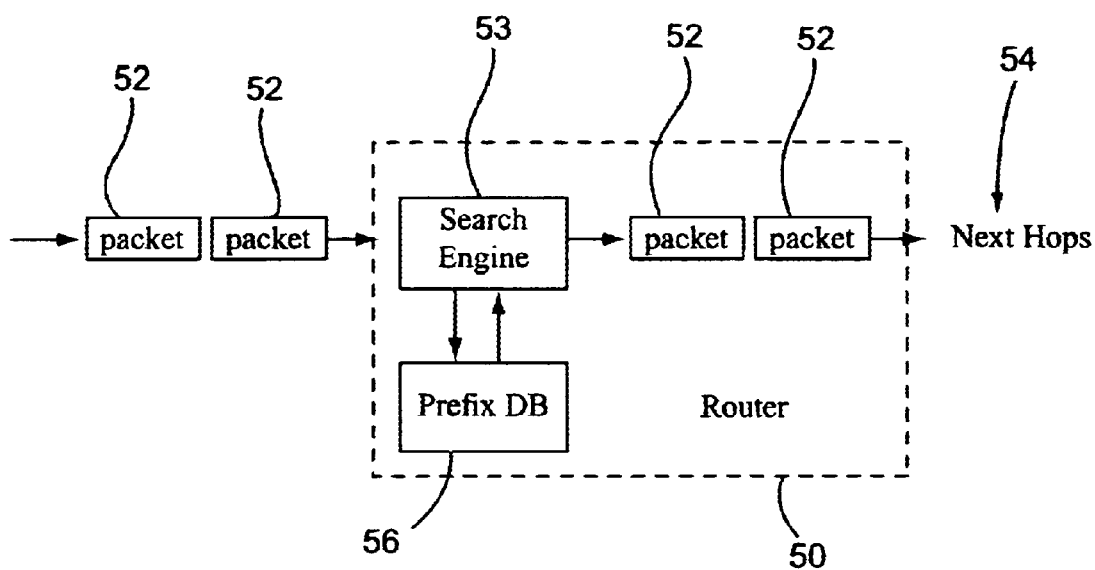
FIG. 1 is a block diagram of a typical packet forwarding process in a router.
FIG. 2 is a database of prefixes in the {0,1} alphabet.

A typical packet forwarding process in a router 50 is shown generally in FIG. 1. In the router 50, each IP packet 52 contains a destination address. The router 50 must determine for each packet 52 the address of the next hop 54 to which the packet must be forwarded. The router performs this function by checking the destination address using a search engine 53 and finding the longest matching data string (prefix) in a prefix database 56. The database 56 consists of IP address prefixes and their corresponding hops. For example, if the destination address of the packet is 1011 0001 1000, and the database is that of FIG. 2, the packet is sent to hop 10 because the prefix 10110001* is the longest matching prefix with the packet destination address.

Figure 3:
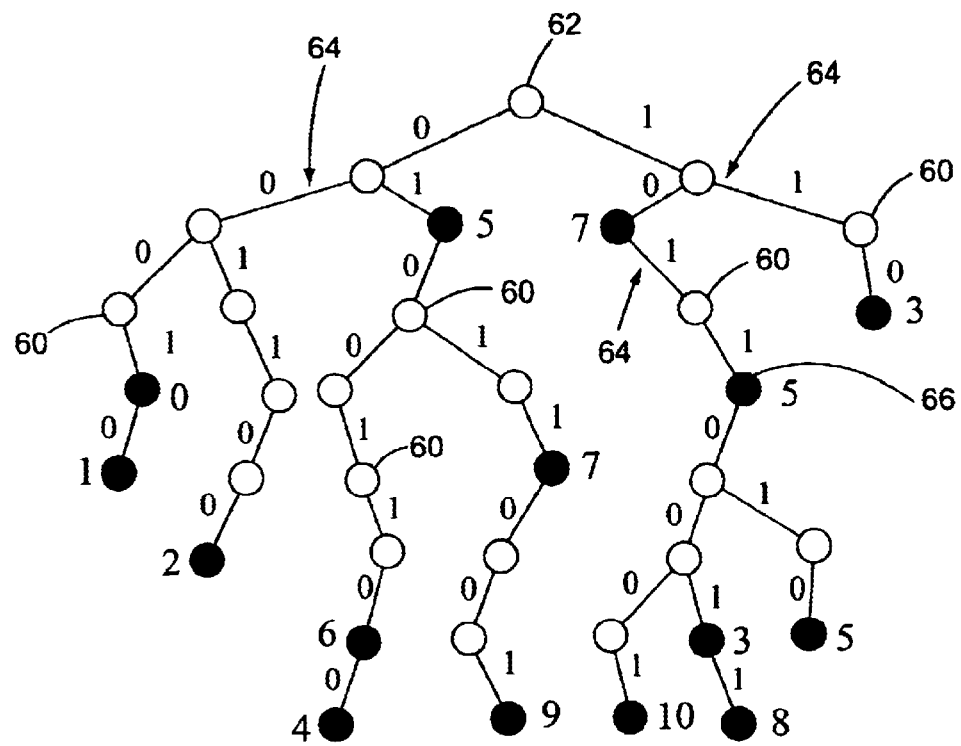
FIG. 3 is a trie in the {0,1} alphabet for the data elements of the data set of FIG. 2.

A trie 58, which is based on the "thumb-index" scheme of a large dictionary, as shown in FIG. 3 for the data strings of FIG. 2, is essentially an m_way tree wherein each internal node of a trie has m branches and each branch corresponds to a character in the alphabet. Each data string in a trie is represented by a leaf and its value corresponds to the path from the root to the leaf. In FIG. 3, m is 2 and the alphabet is only {0,1}. The blank internal nodes 60 are place holders and do not represent any data element. Starting from the root 62 and following the branches 64 corresponding to the characters in the query string to leaf 66 at each internal node in FIG. 3 is a prefix in the path from the root to the end leaf. In this trie, the search time corresponds to the length of data elements. Further, the number of branches corresponds to the number of characters in the alphabet.

The method of the present invention compares and sorts data sets including data strings of indeterminate length in a common character set. The method compares the data strings to identify the existence, or non-existence, of a common prefix portion (i.e., a portion of the data strings that have the same value).

If a common prefix portion comprises the entirety of one of the compared data strings, the method compares the first additional character in the longer length string to a check point character ($\perp$) to determine the values of the data strings for sorting. If the common prefix portion comprises less than the entirety of the data strings, then the method compares the first character that has a different value (i.e., the first discriminant character) to determine the values of the data strings for sorting. Finally, if no common prefix portion exists, the method compares the first character in each data string to determine the values of the data strings for sorting. If the compared value of any two characters is the same, the method then compares the next character.

The method performs the compare and sort function based on the following definition: if there are two strings $A=a_1a_2 \ldots a_n$ and $B=b_1b_2 \ldots b_m$ where $a_i$ and $b_j$ are characters of alphabet $\Sigma$ and there is a check point character $\perp$ which belongs to $\Sigma$, then, if n=m, two strings have the same length, the values of A and B are compared to each other based on the order of characters in $\Sigma$, and if n≠m (assume n<m), then, the two substrings $a_1a_2 \ldots a_n$ and $b_1b_2 \ldots b_n$ are compared to each other. The substring with the bigger (smaller) value is considered bigger (smaller) if two substrings are not equal. If $a_1a_2 \ldots a_n$ and $b_1b_2 \ldots b_n$ are equal, then, the (n+1)th character of the longer string is compared to the check point character. $B \leq A$ if $b_{n+1}$th is equal or before the check point character $\perp$ in the ordering of the characters in $\Sigma$, and B>A otherwise.

The check point character ($\perp$) is preferably selected in such a way that the probability of any character(s) being greater than the check point character is about equal to the probability of any character(s) being less than the check point character. For example, in the English alphabet, assuming that the probability of a character in the range A–M is about equal to the probability of a character in the range N–Z, M is selected as the check point character ($\perp$).

Applying the comparing method of the invention, BOAT is smaller than GOAT and SAD is larger than BALLOON. CAT is larger than CATEGORY because the fourth character in CATEGORY, E, is smaller than M. In the alphabet{0,1}, the present method selects the check point character $\perp$ as 0. When applying the method of the invention, 1101 is greater than 1011 and smaller than 11101, and 1011 is greater than 101101. The method may be applied, for example, to the data set in FIG. 2 and the prefixes sorted in ascending order as follows: 00010*,0001*,001100*,01001100*,0100110*, 01011001*,01011*,01*,10*,10110001*,101100 1*,10110011*,1011010*,1011*,110*

The method of the present invention compares data strings preferably according to the following compare function: if there are two strings $A=a_1a_2 \ldots a_n$ and $b_1b_2 \ldots b_m$ where $a_i$ and $b_j$ are characters of alphabet $\Sigma$, then, A and B are matching if n=m and the two strings are identical, or (assuming m>n), two $a_1a_2 \ldots a_n$ and $b_1b_2 \ldots b_n$ substrings are the same. Otherwise, A and B are not matching.

Figure 4:
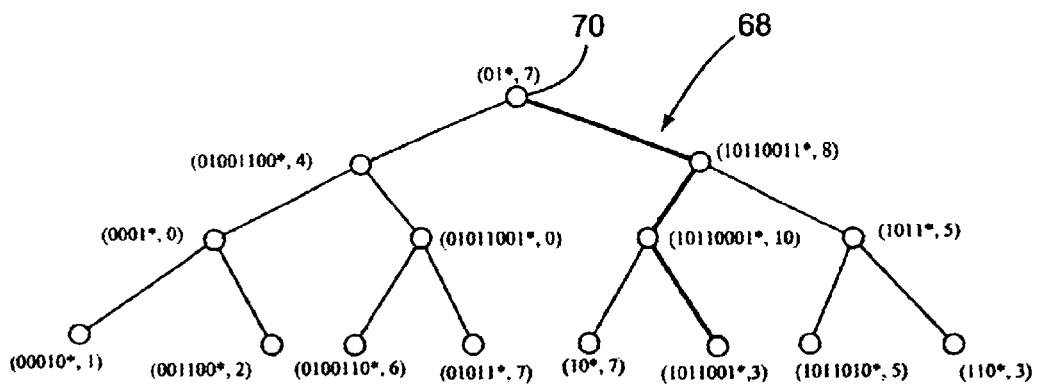
FIG. 4 is a binary balanced tree for the data elements of the data set in FIG. 2.

FIG. 4 shows the result of applying a typical binary search tree 68 to the strings (prefixes) of the database of FIG. 2. This data structure (binary search tree) identifies the longest matching prefix of string 101100011000. The thick lines show the search path for this string. The search is the same as in any binary search tree, starting from the root 70, comparing the query string with its value and following a subtree based on the comparison result. The search must be followed to the leaves to determine the longest matching prefix. The typical binary tree search fails to find the longest matching prefix of string 101100001000 because prefixes are ranges and not just a data point in the search space.

The method of the present invention defines two data strings as disjoint if A and B are not a prefix (or substring) of each other and further defines a string S as an enclosure if there exists at least one data string such that S is a prefix of that string. For example, in the character set defined by the English language, BAT and PHONE are disjoint, but DATE is an enclosure of DATED and DATELINE. As another example, in the {0,1} character set, 1011 is an enclosure in the data set of FIG. 2. An enclosure represents its data space as a point in the data set. All data strings in FIG. 2 which are included in the range of 1011, such as 1011001, 1011010, and 1011 itself are considered as a point represented by 1011. In the method of the present invention, a data element may be included in an enclosure or be disjoint with all other elements.

Using the method of the present invention, if a set of data strings are disjoint, then, a binary tree built based on the sort function of the present method identifies the matching prefix(es) of any query string.

The present method modifies the binary search tree in order to search a data set of strings with enclosures. The method, when building a binary tree, divides the data space into half recursives. Each subtree in the binary tree is a data space represented by the element in the root of the subtree and each enclosure is also defined as a point which includes all matching strings in its data space. The method sorts the data strings and a binary tree is constructed in a typical manner by recursively splitting the data space into two at each step. If the split point is a disjoint string the building process follows as usual. When the split point is an enclosure, all included data strings are distributed in the right and left subtree according to the compare function and the property of the binary search tree. It should be apparent to one skilled in the art that an enclosure may be chosen as split point, or a root, even though there are some other disjoint data elements. The building process is applied to the subspaces recursively.

Figures 5, 6, 7:
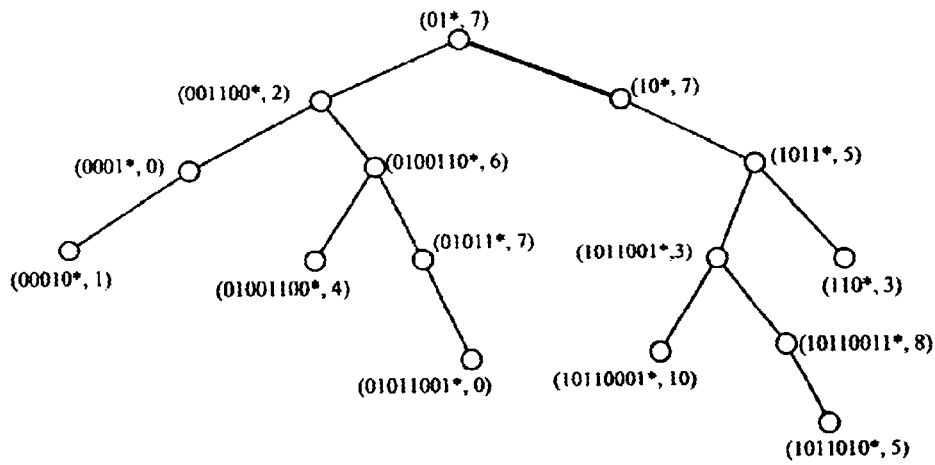
FIG. 5 is a diagram of the first stage in sorting the data prefixes in FIG. 2 according to the method of the present invention.
FIG. 6 is a diagram of the second stage of sorting the data prefixes in FIG. 2 according to the method of the present invention.
FIG. 7 is a binary prefix tree constructed using the data elements of the data set in FIG. 2.

FIG. 5 shows the result of the first sorting step in applying the method of building a binary search tree for the data set of FIG. 2. There are only five disjoint elements, 0001, 0001100, 01, 10 and 110, with 01 being the median and defined as the split point. 01 is an enclosure, and therefore all elements contained in it are distributed in two subspaces and placed on the left subspace because all of the data strings are smaller than the split point as defined. FIG. 6 shows the application of the method to the left subspace and FIG. 7 shows the final binary tree. The tree may be unbalanced, but one skilled in the art should recognize that, in the worst case, the search will take one additional step to reach the same result as the binary tree of FIG. 4, with an accurate result.

The method of the present invention may be applied to building different tree structures, including building index structures.

The present invention includes two procedures for sorting a set of strings with different lengths that may include enclosures. Both procedures provide that each enclosure has a bag in which all elements contained in its space are placed. The sorting procedure applied is based on the sorting definition.

The first sorting procedure is similar to "bubble sort" and defined as follows:
/* List contains all initial and sorted strings. */

```
Sort(List)
    for all i in List do;
        compare i with all j in List where j≠i;
            if i matches j then
                put j in i's bag.
                delete j from List.
            else if i is shorter than j, then /* i is enclosure of j */
                put i in j's bag.
                replace i with j.
                delete i from List.
            else if j<i, then,
                replace i with j.
        end compare;
    end for;
end Sort;
```

This procedure sorts the data strings, while filling enclosures with their data elements (enclosurizing). The enclosurizing process is applied recursively to the data set in order to build the prefix tree.

In the preferred embodiment, the sort procedure divides the data space into three, instead of two, if the split point is an enclosure. Smaller data strings are placed in the left side of the partition point, with the larger data strings in the right side. Finally, the matching elements, the strings which are in the space of the split string, are put in its bag. If the split point is disjoint with the rest of data, the regular quick sort method is used.

To identify the split element, the method preferably selects the element with the minimum length at each step. The MinLength function in the following sort procedure results in a list of strings and returns the one with the minimum length. The sort procedure is defined recursively as follows:
/* List contains all initial and sorted strings. */

```
Sort(List)
    if List is empty return.
    tmpMinLength(List);
    for all i in List except tmp do;
        compare i with tmp;
        if i matches tmp then
            put i in tmp's bag.
        if i<tmp then
            put i in leftList
        if i> tmp then
            put i in rightList.
    endfor;
    List ←Sort(leftList) &Sort(rightList);
end Sort;
```

The last line in the procedure concatenates the results of sorts from the left to the right subspaces and puts it in the List. In each step, the process tries to find the most probable enclosure point, the minimal length element. Then, it partitions the data space based on the split point and puts matching elements in a bag. Therefore, by recursively applying the procedure, the final result is sorted and enclosurized. In this procedure, splitting must be based on the minimal length string.

Building a prefix binary search tree can be accomplished in a typical manner after sorting the data strings. The building process is the same as any binary search tree. It should again be apparent to one skilled in the art that any one of the disclosed sorting procedures can be used to sort the data strings. In the ordinary binary search tree the data elements are sorted once in the beginning and they remain sorted until the end. In the prefix tree, the strings in the enclosures' bags are not sorted. The sort procedures enclosurize data elements in only one level whereas some strings in the bags may be enclosures of others. The sort process is applied recursively to the subspaces.

In the present invention a BuildTree procedure uses the general Sort procedure and takes a set of strings as the input and returns a pointer to the root of the index structure. Again any of the sort procedures may be used depending upon the application and time requirements. The BuildTree procedure is defined in a recursive format as follows:

```
BuildTree(List)
    if List is empty, return.
    Sort(List);
    let m be the median of List
    root ← m;
    let leftList and rightList contain all elements in the left and right of m.
    if m is an enclosure, then,
        distribute elements in m's bag into leftList and rightList.
    leftChild(root) ← BuildTree(leftList);
    rightChild(root) ← BuildTree(rightList);
    return address of root.
end BuildTree;
```

It should be apparent that with data strings that are sorted, in the next application of the procedure, the procedure will provide a result faster. Preferably, the smaller and larger strings are separated into different bags and sorted and the strings within the bags do not need to be sorted initially. In an alternative embodiment, the smaller and larger data strings are sorted in the split point's bag and then concatenated with the rest of the data strings.

In an alternative embodiment, the BuildTree procedure can be defined as the following (it is assumed the data strings in List are already sorted by the Sort procedure):

```
BuildTree(List)
    if List is empty, return.
    let m be the median of List
    root ← m;
        let leftList and rightList contain all elements
        in the left and right of m.
        if m is an enclosure, then,
            leftList ← leftList & Sort(leftBag);
            rightList ← rightList & Sort(rightBag);
        leftChild(root) ← BuildTree(leftList);
        rightChild(root) ← BuildTree(rightList);
        return address of root.
end BuildTree;
```

It should be noted that leftBag and rightBag contain data strings, which are smaller and larger respectively than the enclosure in its bag. The "&" symbol represents concatenation of two strings.

The method of the present invention provides query processing in the binary search tree, for finding the longest, smallest and all prefixes of a set of given query strings. However, the invention is not limited to these queries and one skilled in art will appreciate other queries that may be provided by this invention.

In searching for the longest matching prefix, for example, the following procedure may be used:
/* tree is a pointer to the root of index tree and str is the query string.*/

```
Search(tree, str)
    if tree=NIL, return NULL;
        if (str < tree(root)) then;
            prefix ←Search(leftChild(tree), str).
        else
            prefix ← Search(rightChild(tree), str).
            if str matches tree(root) and prefix is NULL, then,
                prefix ← tree(root).
            return prefix;
end Search;
```

In an IP lookup application, "str" is a packet IP address and the data elements in the tree nodes are network addresses or prefixes. It should be noted that the Search procedure always substitutes the matching prefix in the upper level with the matching prefix in the lower level.

The method of the present invention can also find the smallest matching prefix, and the procedure is the same as finding the longest prefix, except the procedure terminates when it finds the first matching prefix. The method of the present invention can also find all matching prefixes. In this embodiment, the procedure reports each of the prefixes instead of substituting them with the longer one at each step.

In order to find the strings in the data set of which the query string is a prefix, first, the method searches for a string such that the query string is its enclosure. Enclosures may include the exact matching string. In this query procedure, a PrintStr function recursively traverses the subtree and reports the matching prefixes with an input string:

/* tree is a pointer to the root of index tree and str is the query string.*/

```
Search(tree, str)
    if tree=NIL, return NULL;
        if str is an enclosure of tree(root), then,
            PrintStr(tree(root), str)
            exit;
        if (str < tree(root)) then;
            tree ← Search(leftChild(tree), str).
        else
            prefix ← Search(rightChild(tree), str).
end Search;
```

The method also provides for insertion of new data strings or elements into the tree for searching. The insertion process proceeds in the same manner as any usual binary search tree when the data sets are disjoint or the new string is not an enclosure of any string which is already in the index tree. It should be apparent to one skilled in the art that a formal routine for this process can be accomplished using well known structures and algorithms. When the string to be added is an enclosure of any string in the index tree, the method ensures that enclosure are in a higher level than the strings contained in its data space.

Two procedures or functions of the present invention may be used for adding an enclosure. In the first embodiment the procedure follows the search path and when it finds the first string which is contained in the new string, it inserts the new string in this place and makes the contained element a "child" of the inserted node. In the second embodiment, the search path is followed until the first contained node is determined. Then, the contained string is replaced with the prefix. Next, the replaced string is reinserted in the index tree. Replacing a node with a new element may result in the subtree not remaining sorted. The method must then sort the subtree by moving its data elements around the new inserted string. In the second and preferred embodiment, the insertion procedure is defined as follows:

/* tree is a pointer to the root of the index tree and str is a query string.*/

```
Insertion(tree, str)
    if tree=NIL, then,
        node ← AllocateNode( );
        node ← str;
        make tree parent of node;
        return;
    if str is an enclosure of tree(root) then;
        replace tree(root) with str;
        Insertion(tree,tree(root));
        if str < tree(root), then;
            Move(leftChild(tree), str);
        else
            Move(rightChild(tree), str);
        return;
    if str < tree(root), then;
        Insertion(leftChild(tree), str).
    else
        Insertion(rightChild(tree), str).
end Insertion;
```

The AllocateNode function allocates a new node and the Move function recursively moves all data elements in the subtree to compare to the given query string. It should be noted that reinsertion of the replaced element does not need to start from the root of the index tree and it can be inserted in the subtree rooted in the replaced node.

Alternatively, to the standard binary tree, the present invention provides an 'm_way' tree, which is a reduced height tree, more balanced tree, with more efficient search time. In this tree, no data element can be in a higher level than its enclosure. Nevertheless, this requires checking all the data elements in the tree node at each step instead of just checking few. An m_way can have at each internal node at most m−1 data elements or m branches. The number of data elements in the leaves of this tree do not need to be m and can be much more as a result of an internal node containing m memory addresses. All query processing or search procedures are the same as in a binary tree, except for checking all elements in each node, instead of just checking one data element.

The "dynamic prefix m_way tree" is similar to a B tree in general. This index tree satisfies the condition that no data element is in a higher level than its enclosure. Additionally, the tree is built bottom up like B tree.

The procedure for building an m_way tree is now applied to the data strings of FIG. 8 which again are from the binary alphabet {0,1}. The table contains 34 strings and the data elements longer than 5 bits have an abbreviation to make the final representation of the tree easier. This procedure assumes that each node, internal or leaf, has at most four data elements, implying each space is divided by five. The data elements are inserted into the tree randomly. Therefore, this procedure begins with an empty tree. Then, 01011, 1011010, 10110001 and 0100110 are added to the root node. Adding 110 causes overflow in the root and the node needs to be split. Since all data elements are disjoint, the median, 10110001, is chosen as the split point. The following shows the tree after splitting:

```
              ↙ 10110001 ↘
    (0100110,01011)    (1011010, 110)
```

Later, 10110011, 1101110010, 00010 are inserted, with two data strings added to the right leaf node and the last one to the left. Inserting 1011001 causes overflow on the right leaf and it must be split. 1011001 is an enclosure of 10110011 and may be used as a split point. This element gives the worst splitting result since one space is empty and another full. Thus, because the other elements are disjoint, choosing the median, 1011010, gives better results and following is the tree obtained from splitting:

```
            ↙ 10110001    ↓    1011010 ↘
(00010,0100110,01011)  (1011001,10110011)  (110,1101110010)
```

In the next step for building the tree, inserting 01 and 10001101 causes overflow in the left leaf. 01 is enclosure for 0100110 and 01011, and may be a split point. This is the only possible split point because 0100110 and 01011 cannot be placed in levels higher than 01 according to the prefix tree specification. Therefore, the building of the tree proceeds as follows:

```
          ↙ 01    ↓   10110001   ↓   1011010 ↘
(00010,0100110,01011) (10001101) (1011001,10110011) (110,1101110010)
```

Adding 0001, 10110111, 11101101, 100110100, 101011011, 101101110 and 101101000 causes no particular splitting procedure to be implemented. Next, 1011 is inserted. 1011 is an enclosure of 1011010 and 10110001 at the first level. 1011 cannot be in a lower level than its enclosed elements. Thus, the tree is built such that this data string is added to a higher level or at least to the same level of its enclosed elements (i.e., level one). 1011 is placed in level one in order to reduce the height and the search time of the tree. It should be noted that placing it between other data elements is not sufficient. The data strings in each subtree, and consequently in the tree itself, are sorted and divided with respect to the strings in the root of the subtrees. Each data element in the higher level divides the space in the lower levels.

1011 does not represent any space and strings in the lower level are not split based on it. In one embodiment, the present method places 1011 in level one but marks it as an element which does not pop out from the splitting in lower levels. Then, the search and insertion procedure will ignore the space it represents. The later splitting of the node 1011 can go to the upper level. Alternatively, the preferred method replaces one of the enclosed strings of 1011 with 1011, the one which is closest in the sort ordering. Then, reinserting the enclosed element into the tree later.

1011010 is replaced with 1011 and then 1011010 is reinserted into the tree. Based on the definition of this method, 1011 is greater than 1011010. All of the elements in the left side of 1011010 will be smaller than 1011 and they must remain there. The data strings in the right side, which are all larger than 1011010 may not be larger than 1011. Thus, the data elements in the right side must be sorted and moved according to data string 1011. In this example, all elements are larger and stay in their original places. In general, the procedure needs to divide a space represented by a node based on a new prefix. Therefore, the tree is now built as shown:

```
         ↙ 01 ↓ 10110001 ↓ 1011010 ↓ 1011 ↘
(00010,0001,D,01011)  (L,P,Q)  (B,F,X)      (S)  (110,M,K)
```

Figures 8, 9:
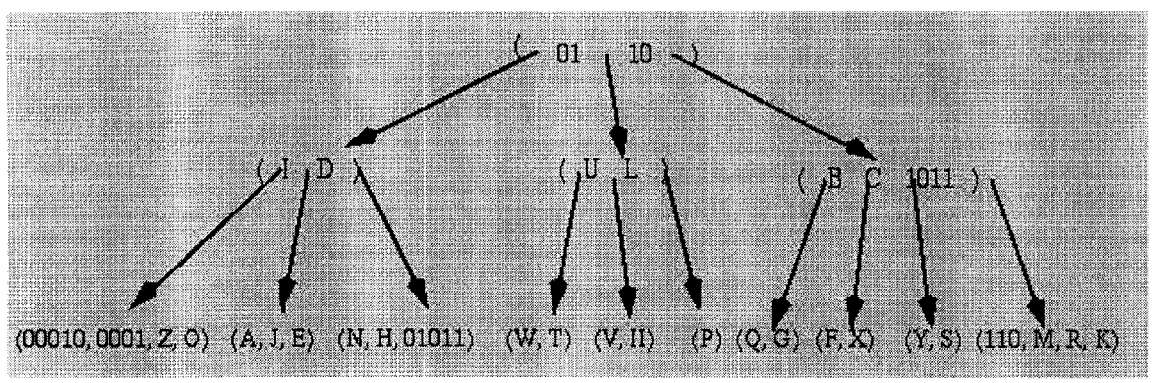
FIG. 8 is a set of data strings in the {0,1} alphabet.
FIG. 9 is a dynamic m_way prefix tree constructed according to the method of the present invention for the data prefixes in FIG. 8.

FIG. 9 shows the final dynamic m_way tree structure for the elements of FIG. 8. It should be noted that the height of the tree is 3 and the search process is faster.

The present invention also provides a method for building a dynamic m_way prefix tree for a set of data strings with different lengths.

When node splitting, the method must determine the split point in a node. In a B tree, the median element is chosen for splitting the space. In the dynamic m_way prefix tree, the split point may be selected in the following order for an overflow node:

1. If all strings in the node are disjoint, the median is selected as the spilt point;
2. If there is an enclosure which encloses all other data strings in the node, it is selected for splitting the tree node;
3. In all other cases, the data elements can be a combination of disjoint spaces and strings. In that case, an enclosure or a disjoint element which gives the best splitting result is chosen as the split point. The method must avoid taking elements in the left most or right most subtree as the split point, as this results in the worst splitting scheme (i.e., one node full and another empty).

The present method also provides for space division when a data string is replaced by its enclosure in an internal node of a prefix tree. In this case, the data strings in a subtree are sorted and the data space is divided by the data elements in the root node of the subtree. According to the tree definition, all strings in the left subtree are smaller than the root and the elements in the right subtree are larger. When the root is replaced by another data element the method should check all elements in the subtree and move elements which violate this condition. The method then needs to divide the data space with respect to the new string in the root. The method must divide the subspace either in the left or right. If the new string is bigger than the replaced string in the root, all elements in the left subtree still will be smaller than the new string and will remain in their original place. Some data elements in the right subtree may be smaller and must be moved to the left. The method does this recursively from the top to the leaves. The following procedure for dividing a (sub)space with respect to a new string is provided (assuming the enclosure or the new string is bigger than the original one). The elements in the right subtree are checked for being smaller. Checking the left subtree is the same except the smaller sign (<) in the while condition must be replaced with the larger sign (>). The following space division procedure is provided:

/* node is a pointer to a node and str is the new split point. */

```
SpaceDiv(node, str, left,right)
    if node is NULL return.
    i ← first str in node;
    while(i<str & i is not nil)
        delete i from right and add it to left
        i ← next str in node;
    end while;
    SpaceDiv(i.left, str, newLeft,newRight),
    add newLeft to the end of left.
    add newRight to the beginning of right.
end SpaceDiv;
```

It should be noted that left, right, newLeft and newRight are the pointers to the nodes of the index tree which contain a list of strings. A pointer and a string are added in the same way to the lists pointed by left and right. Further, i.left gives the pointer in the left and the last pointer in the node when i is nil. It should be appreciated by one skilled in the art that this procedure is not required in the building process if strings with shorter lengths are inserted first.

The insertion procedure, used to build the dynamic m_way prefix tree, which uses the Split, SpaceDiv and NewNode functions to split a node if it is full, divides a space if an element is replaced by its enclosure, and allocates a new node if a node is full and is going to be split. RightChild and leftChild return the right and left pointers of a data element in an internal node. The insertion procedure may be defined as follows:
/* tree is a pointer to the root of the index tree. */

```
Insertion(tree, str)
    if tree is leaf, then,
        if tree is full, then,
            node ← NewNode( );
            Spilit(tree, node, str);
            insert str in the corresponding node, or tree.
        else
            insert str in tree.
        return;
    if str is enclosure of any element in the node pointed by tree, then,
        replace the closet contained element i in str with str;
        if (str> i) then;
            SpaceDiv(rightChild(str), str, left, right);
            Merge(leftChild(str),left);
        else
            SpaceDiv(leftChild(str), str, left, right);
            Merge(right, rightChild(str);
            insert i in tree
        return;
    i ← first string in tree(node);
    while (i<str or no next element in tree(node))
        i ← next string in tree;
    if str is greater than all elements (i is the last one), then;
        Insertion(rightChild(i), str)
    else
        Insertion(leftChild(i), str)
end insertion;
```

The SpaceDiv procedure is needed to divide the space according to the new root element.

The search procedure for the dynamic m_way prefix tree is similar to a B tree, except all data elements in each node are checked exhaustively. The procedures for finding the longest prefix matching, the smallest prefix matching and all prefixes of a query string are the same as the binary search tree. It should be noted that if there are two matching prefixes of a query string which are at two different levels, the one in the lower level has longer length.

The preferred procedure of the present invention for searching for the longest prefix of a given query string in an m_way prefix tree (both static and dynamic m_way prefix trees) is as follows:
/* tree is a pointer to the root of the index tree and str is the query string.*/

```
Search(tree, str)
    if tree=NIL, return NULL;
    i ← first element in tree(node).
    while(str < i & i is not nil) do;
        i ← next element in tree(node).
        j ← i;
    enddo;
    if i is not nil, then
        prefix ← Search(leftChild(i), str).
    else
        prefix ← Search(rightChild(j), str).
        if prefix is NULL, then,
            prefix ← the longest prefix in tree(Node) matching str.
        return prefix;
```

In defining the above search procedure, the list of strings in each node must terminate with nil.

The method of the present invention may be implemented in many different applications. One such application is the Internet. In this application a preferred device for performing the method is a router. The method may be implemented in the router 50 as shown in FIG. 1.

Figure 10:
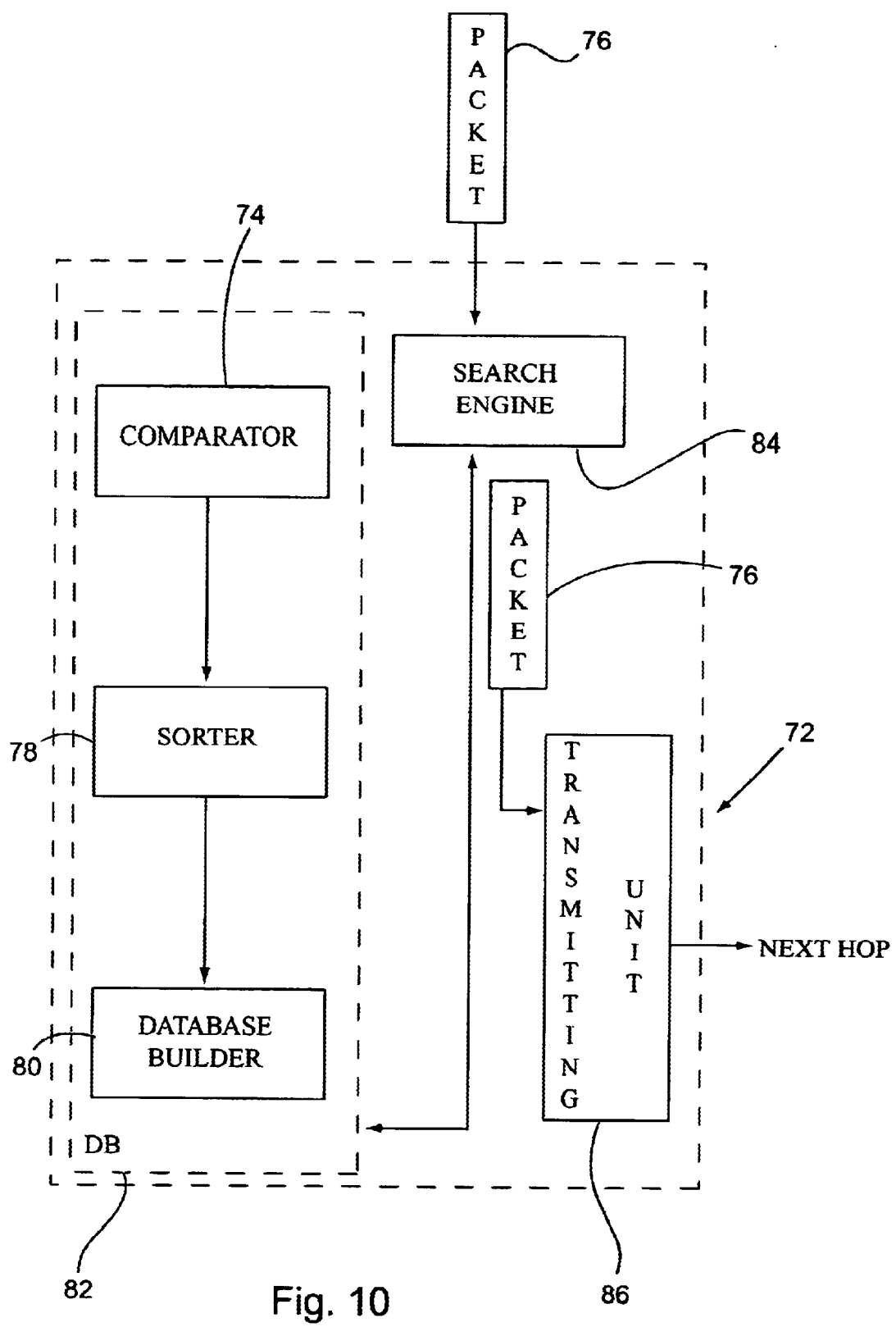
FIG. 10 is a schematic block diagram of a router constructed according to the principles of the present invention.

A typical router is shown schematically in FIG. 10 and indicated generally by reference numeral 72. The router 72 for forwarding data packets based on the method of the present invention, includes a comparator 74 that compares the value of the data strings. The data strings are then sorted by a sorter 78 based on the value of the data strings. The sorted data strings are organized in a tree structure (e.g., binary tree, static m_way tree or dynamic m_way tree) by a database builder 80 and stored in a database (DB) 82. Once stored in a tree structure format, data packets 76 sent to the router 72, are processed in a search engine 84, using the stored data, and the router 72 transmits the data packet 76 to the next hop using a transmitting unit 86. Therefore, in operation, the router 72 is able to quickly and efficiently determine the next hop or address to which the data packet 76 should be sent.

Therefore, while the present invention has been described by reference to specific embodiments, it should be understood and apparent to those skilled in the art that modifications and variations of the invention may be constructed without departing from the scope of the invention. It is therefore intended that the invention be limited only by the scope of the claims appended hereto, and their legal equivalents.

What is claimed is:

1. A method for comparing a data set comprised of at least two data strings of indeterminate length in a common character set, the method comprising the steps of:
    comparing said data strings to identify the existence, or non-existence, of a common prefix portion,
    if a common prefix portion exists, then setting a specific check point character such that the probability of a character in the character set being greater than the check point character is about equal to the probability of a character in the character set being less than the check point character;
    if the common prefix portion comprises the entirety of one of said data strings, then comparing a first additional character in a longer length data string to the check point character to determine if the first additional character is less than or equal to the value of the check point character, with the longer length data string having a lesser value if the value of the first additional character is less than or equal to the value of the check point character and the longer length data string having a greater value if the first additional character is greater than the value of the check point character,
    if the common prefix portion comprises less than the entirety of said data strings, then comparing a first discriminant character in each of the data strings to determine if one discriminant character is less than or greater than another discriminant character, then
    if the value of the first discriminant character of one of the data strings is less than the first discriminant character of another data string, the data string has a lesser value,
    if the value of the first discriminant character of one of the data strings is greater than the first discriminant character of another data string, the data string has a greater value, and
    if the value of the first discriminant character or each data string is equal, comparing the next character in each data string.

2. The method according to claim 1 further comprising the step of, if no common prefix portion exists, then comparing the first character in one data string to the first character of another data string to determine if the first character is less than or greater than the value of the first character of the another data string; and
- if the value of the first character is less than the first character of the another data string, then the data string has a lesser value,
- if the value of the first character is greater than the first character of another data string, then the data string has a greater value, and
- if the value of the first character in the data string is equal to the first character of another data string, comparing the next character in each data string.

3. The method according to claim 2 further comprising the step of sorting the data strings based on the data string value.

4. The method according to claim 3 further comprising the step of first placing data strings having a common prefix portion into a sorting bag.

5. The method according to claim 4 wherein sorting the data strings comprises first sorting the data strings having no common prefix portion and then sorting the data strings in the sorting bag.

6. The method according to claim 3 further comprising the step of recursively dividing the sorted data strings into two data spaces to build a binary search tree.

7. The method according to claim 3 further comprising recursively dividing the sorted data strings into more than two data spaces to build a static m_way tree.

8. The method according to claim 7 further comprising the step of first determining the data string having the shortest character length before recursively dividing the data strings into two data sets, with the data strings of lower value than the data string having the shortest character length and the data strings of higher value than the data string having the shortest character length into different sub-trees based on the shortest length data string.

9. The method according to claim 7 further comprising dynamically inserting additional data strings into the tree to build a dynamic m_way tree.

10. The method according to claim 9 further comprising the step of dividing the m_way tree into two sub-trees if the number of elements at a node exceeds a pre-determined value.

11. The method according to claim 10 further comprising the step of dividing the m_way tree into two sub-trees if the data strings at a node include a common prefix portion of the node data element.

12. The method according to claim 11 further comprising the step of dividing the m_way tree into two sub-trees at a median point if the data strings at the node do not include any common prefix portion of the node data element.

13. The method according to claim 12 wherein the step of dynamically inserting additional data strings includes replacing a data element with an inserted data element if the inserted data element includes a common prefix portion of the replaced element, then sorting all other data elements in the sub-tree of the replaced data element.

14. The method according to claim 13 wherein the data strings are alphanumeric prefixes of other alphanumeric data strings and further comprising the step of searching the data strings using an alphanumeric argument of the prefix.

15. The method according to claim 14 wherein the data strings are prefixes of network addresses in TCP/IP protocols along with a hops name and associated address in a router and further comprising the step of searching the data strings using a packet destination address to find a longest prefix match.

16. The method according to claim 15 further comprising transmitting the hop associated with the longest matching network address.

17. The method according to claim 14 wherein the data strings are prefixes of network addresses in TCP/IP protocols along with port numbers, protocol name and address associated with the network address in a router, and further comprising using host addresses contained in the TCP/IP packet for searching and classifying packets based on the source and destination address.

18. The method according to claim 17 wherein the host address is contained in a TCP/IP packet and further comprising switching packets in layer 3 of the TCP/IP protocol.

19. The method according to claim 17 wherein the host address is contained in a TCP/IP packet and further comprising switching packets in layer 4 of the TCP/IP protocol.

20. The method according to claim 17 wherein transmitting packet information includes filtering packet information using packet classification information.

21. The method according to claim 20 further comprising providing differentiated service based on the packet classification information.

22. The method according to claim 21 further comprising providing data protection based on the packet classification information.

23. The method according to claim 12 further comprising determining the longest prefix string of a query string based on the sorted data elements.

24. The method according to claim 12 further comprising determining the shortest prefix string of a query string based on the sorted data elements.

25. The method according to claim 12 further comprising determining all prefix data strings of a query string based on the sorted data elements.

26. The method according to claim 12 further comprising determining all data strings of which the query string is a prefix based on the sorted data elements.

27. In a method for comparing, sorting and searching a data set comprised of at least two data strings of indeterminate length in a common character set, the method comprising the steps of:
- comparing said data strings to identify the existence, or non-existence, of a common prefix portion,
- if a common prefix portion exists, then setting a specific check point character such that the probability of a character in the character set being greater than the check point character is about equal to the probability of a character in the character set being less than the check point character;
- if the prefix portion comprises the entirety of one of said data strings, then comparing a first additional character in a longer length data string to the check point character to determine if the first additional character is less than or equal to the value of the check point character, with the longer length data string having a lesser value if the value of the first additional character is less than or equal to the value of the check point character and the longer length data string having a greater value if the first additional character is greater than the value of the check point character;
- if the common prefix portion comprises less than the entirety of said data strings, then comparing a first discriminant character in each of the data strings to determine if one discriminant character is less than or greater than another discriminant character, and
- if the value of the first discriminant character of one of the data strings is less than the first discriminant character of another data string, the data string has a lesser value, if the value of the first discriminant character of one of the data strings is greater than the first discriminant character of another data string, the data string value has a greater value, and if the value of the first discriminant character of each data string is equal, comparing the next character in each data string;

if no common prefix portion exists, then comparing the first character in one data string to the first character of another data string to determine if the first character is less than or greater than the value of the first character of the another data string; and if the value of the first character is less than the first character of the another data string, then the data string has a lesser value, if the value of the first character is greater than the first character of the another data string, then the data string has a greater value, and if the value of the first character is equal to the first character of the another data string, comparing the next character in each data string;

sorting the data strings based on the data string value;

building a search tree, and searching the data strings using the search tree.

28. The method according to claim 27 further comprising the step of first placing data strings having a common prefix portion into a sorting bag.

29. The method according to claim 27 wherein the data strings are prefixes of network addresses in TCP/IP protocols along with a hops name and associated address in a router and further comprising the step of searching the data strings using a packet destination address to find a longest prefix match.

30. The method according to claim 29 further comprising transmitting the hop associated with the longest matching network address.

31. The method according to claim 30 wherein the host address is contained in a TCP/IP packet and further comprising switching packets in layer 3 of the TCP/IP protocol.

32. The method according to claim 30 wherein the host address is contained in a TCP/IP packet and further comprising switching packets in layer 4 of the TCP/IP protocol.

33. The method according to claim 27 wherein the data strings are prefixes of network addresses in TCP/IP protocols along with port numbers, protocol name and address associated with the network address in a router, further comprising using host addresses contained in the TCP/IP packet for searching and classifying packets based on the source and destination address.

34. In a router for forwarding data packets, wherein the router finds the next hop for each packet by finding the longest data prefix matching a packet destination address and a corresponding hop from a prefix lookup table, wherein data strings are of indeterminate length in a common character set, the router comprising:

a comparator for comparing said data strings to identify the existence, or non-existence, of a common prefix portion, wherein if a common prefix portion exists, the comparator sets a specific check point character such that the probability of a character in the character set being greater than the check point character is about equal to the probability of a character in the character set being less than the check point character, if the prefix portion comprises the entirety of one of said data strings, then the comparator compares a first additional character in a longer length data string to the check point character to determine if the first additional character is less than or equal to the value of the check point character, with the longer length data string having a lesser value if the value of the first additional character is less than or equal to the value of the check point character and the longer length data string having a greater value if the first additional character is greater than the value of the check point character, if the common prefix portion comprises less than the entirety of said data strings, then the comparator compares a first discriminant character in each of the data strings to determine if one discriminant character is less than or greater than another discriminant character, and if the value of the first discriminant character of one of the data strings is less than the first discriminant character of another data string, then the data string has a lesser value, if the value of the first discriminant character of one of the data strings is greater than the first discriminant character of another data string, then the data string has a greater value, and if the value of the first discriminant character of each data string is equal, the comparator compares the next character in each data string, and if no common prefix portion exists, then the comparator compares the first character in one data string to the first character of another data string to determine if the first character is less than or greater than the value of the first character of the another data string, and if the value of the first character is less than the first character of the another data string, the data string has a lesser value, if the value of the first character is greater than the first character of another data string, the data string has a greater value, and if the value of the first character in the data string is equal to the first character of the another data string, the comparator compares the next character in each data string;

a sorter for sorting the data strings based on the data string value; and a database builder for building a search tree.

35. The router according to claim 34 further comprising a search engine for finding the longest matching data string to a data packet.

36. The router according to claim 35 further comprising a transmitting unit for transmitting the hop associated with the longest matching network address.

37. The router according to claim 36 wherein the host addresses contained in the TCP/IP packet are used for searching and classifying packets based on the source and destination address.

38. The router according to claim 37 wherein the host address is contained in a TCP/IP packet and the router switches packets in layer 3 of the TCP/IP protocol.

39. The router according to claim 37 wherein the host address is contained in a TCP/IP packet and the router switches packets in layer 4 of the TCP/IP protocol.

40. The router according to claim 36 wherein the transmitting unit provides differentiated service based on the packet classification information.

41. The router according to claim 40 wherein the transmitting unit provides data protection based on the packet classification information.

* * * * *